(12) United States Patent  
Wiseman

(10) Patent No.: US 8,762,728 B2
(45) Date of Patent: Jun. 24, 2014

(54) METHOD OF PERFORMING AUTHENTICATION BETWEEN NETWORK NODES

(75) Inventor: Simon Robert Wiseman, Malvern (GB)

(73) Assignee: Qinetiq Limited, Hampshire (GB)

( * ) Notice: Subject to any disclaimer, the term of this patent is extended or adjusted under 35 U.S.C. 154(b) by 50 days.

(21) Appl. No.: 13/130,897

(22) PCT Filed: Dec. 2, 2009

(86) PCT No.: PCT/GB2009/002802
§ 371 (c)(1),
(2), (4) Date: May 24, 2011

(87) PCT Pub. No.: WO2010/064004
PCT Pub. Date: Jun. 10, 2010

(65) Prior Publication Data
US 2011/0231665 A1    Sep. 22, 2011

Related U.S. Application Data

(60) Provisional application No. 61/120,181, filed on Dec. 5, 2008.

(30) Foreign Application Priority Data

Dec. 5, 2008    (GB) .................................. 0822254.9

(51) Int. Cl.
*H04L 9/08*    (2006.01)
*H04L 29/06*    (2006.01)
(52) U.S. Cl.
USPC ............................ 713/171; 380/279; 380/256
(58) Field of Classification Search
None
See application file for complete search history.

(56) References Cited

U.S. PATENT DOCUMENTS 3,704,996 A    12/1972    Borner et al.
4,291,939 A    9/1981    Giallorenzi et al.
(Continued)

FOREIGN PATENT DOCUMENTS

EP    0 583 115 A1    2/1994
EP    0 610 727 A1    8/1994
(Continued)

OTHER PUBLICATIONS

Howard, P, et al., Communication Security, Publication Date Jan. 3, 2007, WO 2007/023286 A1, pp. 1-16.*

(Continued)

*Primary Examiner* — Gilberto Barron, Jr.
*Assistant Examiner* — Malcolm Cribbs
(74) *Attorney, Agent, or Firm* — Oliff PLC

(57) ABSTRACT

A method of authentication between first (QNodeX) and second (QNodeY) network nodes within a network suitable for implementing quantum cryptography comprises steps in which the first and second nodes each generate a cryptographic hash ([MXY]AI, [MYX]AJ) of a message ([MXY], [MYX]) using respective authentication keys (AI, AJ) shared with a third network node (QNodeW). The messages may be those exchanged between the first and second nodes during agreement of a quantum key to be used between the nodes. An authentication key to be shared by the first and second nodes may be established using the quantum key. The invention therefore allows an authentication key to be established and shared between the first and second network nodes without direct physical intervention. Networks having large numbers of network nodes may be re-keyed following replacement or maintenance of a network node much more quickly and easily than is the case where re-keying is achieved by physically supplying shared authentication keys.

8 Claims, 5 Drawing Sheets

(56) References Cited

U.S. PATENT DOCUMENTS

| | | | |
|---|---|---|---|
| 4,691,984 A | 9/1987 | Thaniyavarn |
| 4,775,971 A | 10/1988 | Bergmann |
| 4,807,952 A | 2/1989 | Jaeger et al. |
| 4,846,540 A | 7/1989 | Kapon |
| 5,150,436 A | 9/1992 | Jaeger et al. |
| 5,166,991 A | 11/1992 | Jaeger et al. |
| 5,410,625 A | 4/1995 | Jenkins et al. |
| 5,414,789 A | 5/1995 | Tamil et al. |
| 5,428,698 A | 6/1995 | Jenkins et al. |
| 5,479,514 A | 12/1995 | Klonowski |
| 5,566,257 A | 10/1996 | Jaeger et al. |
| 5,644,664 A | 7/1997 | Burns et al. |
| 5,757,912 A | 5/1998 | Blow |
| 5,768,378 A | 6/1998 | Townsend et al. |
| 5,878,142 A | 3/1999 | Caputo et al. |
| 6,028,935 A | 2/2000 | Rarity et al. |
| 6,145,079 A | 11/2000 | Mitty et al. |
| 6,240,514 B1 | 5/2001 | Inoue et al. |
| 7,068,790 B1 | 6/2006 | Elliott |
| 7,155,078 B2 | 12/2006 | Welch et al. |
| 7,162,107 B2 | 1/2007 | Bull et al. |
| 7,242,775 B2 | 7/2007 | Vig et al. |
| 7,242,821 B2 | 7/2007 | Bull et al. |
| 7,248,695 B1 | 7/2007 | Beal et al. |
| 7,274,791 B2 | 9/2007 | Van Enk |
| 7,289,688 B2 | 10/2007 | Bull et al. |
| 7,430,295 B1 | 9/2008 | Pearson et al. |
| 7,457,416 B1 | 11/2008 | Elliott |
| 7,460,670 B1 | 12/2008 | Elliott |
| 7,515,716 B1 | 4/2009 | Elliott |
| 7,596,318 B2 | 9/2009 | Han et al. |
| 7,646,873 B2 | 1/2010 | Lee et al. |
| 7,706,535 B1 | 4/2010 | Pearson et al. |
| 7,760,883 B2 | 7/2010 | Kuang |
| 7,864,958 B2 | 1/2011 | Harrison et al. |
| 8,054,976 B2 | 11/2011 | Harrison et al. |
| 8,488,790 B2 | 7/2013 | Wellbrock et al. |
| 2002/0025046 A1 | 2/2002 | Lin |
| 2002/0087862 A1 | 7/2002 | Jain et al. |
| 2003/0210912 A1 | 11/2003 | Leuthold et al. |
| 2003/0214991 A1 | 11/2003 | Wiedmann et al. |
| 2004/0034776 A1 | 2/2004 | Fernando et al. |
| 2004/0109564 A1 | 6/2004 | Cerf et al. |
| 2004/0184603 A1 | 9/2004 | Pearson et al. |
| 2004/0184615 A1 | 9/2004 | Elliott et al. |
| 2004/0252957 A1 | 12/2004 | Schmidt et al. |
| 2005/0078826 A1 | 4/2005 | Takeuchi |
| 2005/0135620 A1 | 6/2005 | Kastella et al. |
| 2005/0190921 A1 | 9/2005 | Schlafer et al. |
| 2005/0249352 A1 | 11/2005 | Choi et al. |
| 2005/0259825 A1 | 11/2005 | Trifonov |
| 2005/0286723 A1 | 12/2005 | Vig et al. |
| 2006/0002563 A1 | 1/2006 | Bussieres et al. |
| 2006/0031828 A1 | 2/2006 | Won et al. |
| 2006/0059343 A1 | 3/2006 | Berzanskis et al. |
| 2006/0062392 A1 | 3/2006 | Lee et al. |
| 2006/0067603 A1 | 3/2006 | Bull et al. |
| 2006/0083379 A1 | 4/2006 | Brookner |
| 2006/0290941 A1 | 12/2006 | Kesler et al. |
| 2007/0014415 A1 | 1/2007 | Harrison et al. |
| 2007/0065154 A1 | 3/2007 | Luo et al. |
| 2007/0065155 A1 | 3/2007 | Luo et al. |
| 2007/0071245 A1 | 3/2007 | Kuang |
| 2007/0074277 A1 | 3/2007 | Tofts et al. |
| 2007/0076884 A1 | 4/2007 | Wellbrock et al. |
| 2007/0101410 A1 | 5/2007 | Harrison et al. |
| 2007/0104443 A1 | 5/2007 | Helmy |
| 2007/0122097 A1 | 5/2007 | Schmidt et al. |
| 2007/0123869 A1 | 5/2007 | Chin et al. |
| 2007/0130455 A1 | 6/2007 | Elliott |
| 2007/0133798 A1 | 6/2007 | Elliott |
| 2007/0160201 A1* | 7/2007 | Blom et al. .............. 380/30 |
| 2007/0177735 A1 | 8/2007 | Mimih et al. |
| 2007/0192598 A1 | 8/2007 | Troxel et al. |
| 2008/0003104 A1 | 1/2008 | Betlach |
| 2008/0013738 A1 | 1/2008 | Tajima et al. |
| 2008/0031456 A1 | 2/2008 | Harrison et al. |
| 2008/0137858 A1 | 6/2008 | Gelfond et al. |
| 2008/0144836 A1 | 6/2008 | Sanders et al. |
| 2008/0147820 A1 | 6/2008 | Maeda et al. |
| 2008/0175385 A1 | 7/2008 | Lee et al. |
| 2008/0292095 A1 | 11/2008 | Vig et al. |
| 2008/0317423 A1 | 12/2008 | Stepanov et al. |
| 2009/0016736 A1 | 1/2009 | Beal et al. |
| 2009/0074192 A1 | 3/2009 | Beal et al. |
| 2009/0106551 A1* | 4/2009 | Boren et al. .............. 713/158 |
| 2009/0175452 A1 | 7/2009 | Gelfond et al. |
| 2009/0316910 A1 | 12/2009 | Maeda et al. |
| 2010/0098252 A1 | 4/2010 | Kanter et al. |
| 2010/0226659 A1 | 9/2010 | Nishioka et al. |
| 2010/0290626 A1 | 11/2010 | Jenkins et al. |
| 2010/0293380 A1 | 11/2010 | Wiseman et al. |
| 2010/0299526 A1 | 11/2010 | Wiseman et al. |
| 2010/0329459 A1 | 12/2010 | Wiseman et al. |

FOREIGN PATENT DOCUMENTS

| | | |
|---|---|---|
| EP | 1 503 328 A1 | 2/2005 |
| EP | 1 605 287 A2 | 12/2005 |
| EP | 1 633 076 A1 | 3/2006 |
| EP | 1 643 663 A1 | 4/2006 |
| EP | 1 715 615 A1 | 10/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-117511 | 4/2005 |
| JP | A-2005-268958 | 9/2005 |
| JP | A-2007-500370 | 1/2007 |
| JP | A-2007-053591 | 3/2007 |
| JP | A-2007-129562 | 5/2007 |
| WO | WO 92/11550 A1 | 7/1992 |
| WO | WO 92/11551 A1 | 7/1992 |
| WO | WO 92/11554 A2 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |
| WO | WO 2010/064003 A1 | 6/2010 |
| WO | WO 2010/064004 A1 | 6/2010 |

OTHER PUBLICATIONS

Office Action dated May 11, 2012 issued in U.S. Appl. No. 12/812,849.

(56) References Cited

OTHER PUBLICATIONS

Stucki et al., "Quantum Key Distribution Over 67km With Plug&Play System," New Journal of Physics 4, pp. 41.1-41.8, 2002.
Jun. 1, 2011 International Search Report issued in Application No. PCT/GB2010/001811.
Jun. 1, 2011 Written Opinion issued in Application No. PCT/GB2010/001811.
Toliver P., et al. "Demonstration of 1550 nm QKD with ROADM-based DWDM Networking and the Impact of Fiber FWM," 2007 Conference on Lasers and Electro-Optics, May 5-11, 2007, Baltimore, MD, Optical Society of America, May 6, 2007, pp. 1-2, XP031231023.
Bechmann-Pasquinucci et al., "Quantum key distribution with trusted quantum relay", May 12, 2005, p. 1-13, University of Pavia; UCCI.IT.XP 002534289.
Bennett et al., "Quantum Cryptography: Public Key Distribution and Coin Tossing", International Conference on Computers, Systems & Signal Processing, Dec. 10-12, 1984, pp. 1-5, Bangalore, India.
Duligall et al., "Low cost and compact quantum key distribution", New Journal of Physics, Institute of Physics Publishing, Bristol, GB. vol. 8, No. 10, Oct. 2006, pp. 1-16, 2006, XP 020107565.
Elliott et al., "Building the quantum network", New Journal of Physics, Institute of Physics Publishing, Bristol, GB, vol. 4, 12 Jul. 12, 2002, pp. 46.1-46.12, XP 002271991.
Fernandez et al., "Gigahertz Clocked Quantum Key Distribution in Passive Optical Networks", leos Summer Topical Meetings, 2006 Digest of the Quebec City, Canada, Jul. 17, 2006, pp. 36-37, XP 010940123.
Fernandez et al., "Passive Optical Network Approach to Gigahertz-Clocked Multiuser Quantum Key Distribution", Journal of Quantum Electronics, vol. 43, No. 2, pp. 130-138, Feb. 2007.
Brassard et al., "Multi-User Quantum Key Distribution Using Wavelength Division Multiplexing", Université de Montreal, École, Polytechnique de Montréal, pp. 1-5, XP 002534322.
Gordeev et al., "Tunable electro-optic polarization modulator for quantum key distribution applicators", Optics Communications, vol. 234, pp. 203-210, Feb. 13, 2004.
Horikiri et al., "Quantum key distribution with a heralded single photon source", International Quantum Electronics Conference, 2005, pp. 1617-1618, Jul. 11, 2005.
Lee et al., "Quantum Authentication and Quantum Key Distribution Protocol", Korea University, Jan. 11, 2006, pp. 1-8, XP002534292.
Rao et al., "Nonlinear frequency conversion in semiconductor optical waveguides using birefringent, modal and quais-phase-matching techniques", Journal of Optics A: Pure and Applied Optics, vol. 6, pp. 569-584, 2004.
Ljunggren et al., "Authority-based user authentication in quantum key distribution", Physical Review A, vol. 62, pp. 022305-1-022305-7, Jul. 13, 2000, XP 002534291.
Kuhn, "A Quantum Cryptographic Protocal with Detection of Compromised Server", Quantum Information and Computation, vol. 5, No. 7, 2005, pp. 551-560, XP 002520284.
Kumavor et al., "Comparison of Four Multi-User Quantum Key Distribution Schemes Over Passive Optical Networks", Journal of Lightwave Technology, vol. 23, No. 1, pp. 268-276, Jan. 2005, XP 001227328.
Malis et al., "Improvement of second-harmonic generation in quantum-cascade lasers with true phase matching", Applied Physics Letters, vol. 84, No. 15, pp. 2721-2723, Apr. 12, 2004, XP 12061044.
Masanovic et al., "Design and Performance of a Monolithically Integrated Widely Tunable All-Optical Wavelength Converter with Independent Phase Control", IEEE Photonics Technology Letters, vol. 16, No. 10, pp. 2299-2301, Oct. 2004.
Menezes et al., "Handbook of Applied Cryptography", Chapter 13 Key Management Techniques, CRC Press LLC, 1997, pp. 547-553, XP 002520285.
Nambu et al., "BB84 Quantum Key Distribution System based on Silica-Based Planar Lightwave Circuits", Apr. 22, 2008, pp. 1-11.
Hwang et al., "Provably Secure Three-Party Authenticated Quantum Key Distribution Protocols", IEEE Transactions on Dependable and Secure Computing, vol. 4, No. 1, pp. 71-80, Jan.-Mar. 2007, XP 11165308.
Mo et al., "Quantum key distribution network with wavelength addressing", University of Science and Technology of China, Oct. 15, 2006, pp. 1-11, XP 002534290.
Nguyen et al., "802.11i Encryption Key Distribution Using Quantum Cryptography", Journal of Networks, vol. 1, No. 5, pp. 9-20, Sep./Oct. 2006, XP 002576733.
Moutzouris et al., "Second Harmonic Generation in GaAs/AlGaAs Waveguides with Femtosecond Pulses Near 1.55 μm Using Modal Phase Matching Technique", Lasers and Electro-Optics Europe, Conference Munich, Germany, Jun. 22-27, 2003, XP 010710252.
Jäger et al., "Modal dispersion phase matching over 7 mm length in overdamped polymeric channel waveguides", Applied Physics Letters, vol. 69, No. 27, pp. 4139-4141, Dec. 30, 1996, XP 12016922.
Yin et al., "Inegrated ARROW waveguides with hollow cores," Optics Express, Optical Society of America, Washington, DC, USA, vol. 12, No. 12, pp. 2710-2715, Jun. 14, 2004, XP 002363659.
Yariv, "Coupled-Mode Theory for Guided-Wave Optics", IEEE Journal of Quantum Electronics, vol. QE9, No. 9, pp. 919-933, Sep. 1973.
Rahmatian et al., "An Ultrahigh-Speed AlGaAs—GaAs Polarization Converter Using Slow Wave Coplanar Electrodes", IEEE Photonics Technology Letters, vol. 10, No. 5, pp. 675-677, May 1998, XP 11046059.
Finlayson et al., "Polarization Conversion in Passive Deep-Etched GaAs/AlGaAs Waveguides", Journal of Lightwave Technology, vol. 24, No. 3, pp. 1425-1432, Mar. 2006, XP 002459136.
Grossard et al., "AlGaAs—GaAs Polarization Converter with Electrooptic Phase Mismatch Control," IEEE Photonics Technology Letters, vol. 13, No. 8, pp. 830-832, Aug. 2001, XP 11047704.
Hall et al., "Optical Guiding and Electro-Optic Modulation in GaAs Epitaxial Layers," Optics Communications, vol. 1, No. 9, pp. 403-405, Apr. 1970.
Haxha et al., "Analysis of polarization conversion in AlGaAs/GaAs electrooptic polarization converter", Optics Communications, vol. 262, pp. 47-56, 2006, XP 002459135.
Heaton et al., "Optimization of Deep-Etched, Single Mode GaAs/AlGaAs Optical Waveguides Using Controlled Leakage Into the Substrate", Journal of Lightwave Technology, vol. 17, No. 2, pp. 267-281, Feb. 1999.
Izuhara et al., "Low-voltage tunable TE/TM converter on ion-sliced lithium niobate thin film", Electronics Letters, vol. 39, No. 15, Jul. 24, 2003, XP 6020699.
Schlak et al., "Tunable TE/TM-Mode Converter on (001) In-P-Substrate", IEEE Photonic Technology Letters, vol. 3, No. 1, pp. 15-16, Jan. 1991.
Wang et al., "High Speed III-V Electrooptic Waveguide Modulators at λ = 1.3 μm", Journal of Lightwave Technology, vol. 6, No. 6, pp. 758-771, Jun. 1988.
Kanamori et al., "Three-party Quantum Authenticated Key Distribution with Partially Trusted Third Party," Global Telecommunications Conference, 2008, IEEE Globecom 2008 Proceedings, Piscataway, NJ, USA, Nov. 30, 2008, pp. 1-5. XP 031370037.
Toliver et al., "Demonstration of 1550 nm QKD with ROADM-based DWDM Networking and the Impact of Fiber FWM", 2007 Conference on Lasers, XP 31231032.
Mar. 31, 2009 International Search Report issued in International Application No. PCT/GB2009/000190.
Mar. 31, 2009 Written Opinion of the International Searching Authority in International Application No. PCT/GB2009/000190.
May 16, 2008 British Search Report issued in Application No. GB0801408.6.
Jul. 14, 2009 International Search Report issued in Application No. PCT/GB2009/000189.
Jul. 14, 2009 Written Opinion of the International Searching Authority issued in Application No. PCT/GB2009/000189.
Aug. 3, 2010 International Preliminary Report on Patentability issued in Application No. PCT/GB2009/000179.
Jun. 2, 2009 International Search Report issued in Application No. PCT/GB2009/000179.

(56) References Cited

OTHER PUBLICATIONS

Jun. 2, 2009 Written Opinion of the International Searching Authority issued in Application No. PCT/GB2009/000179.
Apr. 24, 2008 British Search Report issued in Application No. GB0801492.0.
Jul. 28, 2009 International Search Report issued in Application No. PCT/GB2009/000186.
Jul. 28, 2009 Written Opinion of the International Searching Authority issued in Application No. PCT/GB2009/000186.
May 21, 2008 British Search Report issued in Application No. GB0801395.5.
Jul. 14, 2009 International Search Report issued in Application No. PCT/GB2009/001223.
Jul. 14, 2009 Written Opinion of the International Searching Authority issued in Application No. PCT/GB2009/001223.
Jul. 14, 2009 International Search Report issued in Application No. PCT/GB2009/001226.
Jul. 14, 2009 Written Opinion of the International Searching Authority issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Aug. 13, 2008 British Search Report issued in Application No. GB0809038.3.
Aug. 13, 2008 British Search Report issued in Application No. GB0809044.1.
Aug. 14, 2008 British Search Report issued in Application No. GB0809045.8.
Jan. 23, 2009 British Search Report issued in Application No. GB0819665.1.
Mar. 19, 2010 International Search Report issued in Application No. PCT/GB2009/002543.
Mar. 19, 2010 Written Opinion of the International Searching Authority issued in Application No. PCT/GB2009/002543.
Mar. 18, 2009 British Search Report issued in Application No. GB0822356.2.
Dec. 21, 2009 International Search Report issued in Application No. PCT/GB2009/002745.
Dec. 21, 2009 Written Opinion of the International Searching Authority issued in Application No. PCT/GB2009/002745.
Mar. 16, 2009 British Search Report issued in Application No. GB0822254.9.
Sep. 23, 2010 International Search Report issued in Application No. PCT/GB2009/002802.
Sep. 23, 2010 Written Opinion of the International Searching Authority issued in Application No. PCT/GB2009/002802.
Mar. 16, 2009 British Search Report issued in Application No. GB0822253.1.
Apr. 7, 2010 International Search Report issued in Application No. PCT/GB2009/002801.
Apr. 7, 2010 Written Opinion of the International Searching Authority issued in Application No. PCT/GB2009/002801.
Jan. 25, 2010 British Search Report issued in Application No. GB0917060.6.
Mar. 21, 2011 International Search Report issued in Application No. PCT/GB2010/001811.
Mar. 21, 2011 Written Opinion of the International Searching Authority issued in Application No. PCT/GB2010/001811.
Jun. 29, 2010 British Search Report issued in Application No. GB0917060.6.
U. S. Appl. No. 12/993,146 in the name of Hicks et al., filed Nov. 17, 2010.
U. S. Appl. No. 12/993,098 in the name of Wiseman et al., filed Nov. 17, 2010.
U. S. Appl. No. 12/992,695 in the name of Wiseman et al., filed Nov. 15, 2010.
U. S. Appl. No. 13/130,944 in the name of Benton et al., filed May 24, 2011.
U. S. Appl. No. 13/125,735 in the name of Wiseman et al., filed Apr. 22, 2011.
U. S. Appl. No. 13/130,790 in the name of Wiseman et al., filed May 24, 2011.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Le et al. "Enhancement of AGT Telecommunication Security using Quantum Cryptography," Ecole Nationale Superieure des Telecommunications, Eurocontrol Care Project, QCRYPT, France.
Lütkenhaus, "Estimates for Practical Quantum Cryptography," Helsinki Institute of Physics, Feb. 1, 2008, pp. 1-26, Helsinki, Finland.
May 31, 2012 Search Report and Written Opinion issued in International Application No. PCT/GB2011/001670.
Aug. 1, 2012 Office Action issued in U.S. Appl. No. 12/993,098.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No. 12/863,510.
Sep. 21, 2012 Office Action issued in U.S. Appl. No. 12/812,849.
Oct. 4, 2012 Office Action issued in U.S. Appl. No. 12/992,695.
U.S. Appl. No. 13/496,324 in the name of Ayling, filed on Mar. 15, 2012.
U.S. Appl. No. 12/863,483 in the name of Wiseman, filed on Jul. 19, 2010.
U.S. Appl. No. 12/863,509 in the name of Jenkins, filed on Jul. 19, 2010.
Oct. 29, 2012 Office Action issued in U.S. Appl. No. 12/993,146.
Nov. 8, 2012 Office Action issued in U.S. Appl. No. 12/863,510.
Nov. 9, 2012 Office Action issued in U.S. Appl. No. 13/130,790.
Rass, S., "A Method of Authentication for Quantum Networks", PWASET, vol. 12, Mar. 2006; ISSN 1307-6884, pp. 149-154.
Apr. 30, 2013 Translation of Office Action cited in Japanese Patent Application No. 2010-543567 (with translation).
Elliott, "Building the Quantum Network", New Journal of Physics, Jul. 12, 2002, vol. 4, pp. 46.1-46.12.
Ibrahim et al., "Simulation of Static Optical XPM in Active MMI Couplers," (published in International Conference on Numerical Simulation of Optoelectronic Devices, Sep. 2007), pp. 95-96.
Jul. 3, 2013 Office Action issued in U.S. Appl. No. 12/993,098.
Jun. 28, 2013 Office Action issued in U.S. Appl. No. 13/130,790.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in U.S. Appl. No. 13/496,324.
Aug. 29, 2013 Office Action issued in U.S. Appl. No. 12/992,695.
Sep. 18, 2013 Office Action issued in U.S. Appl. No. 12/812,849.
Nov. 5, 2013 Office Action issued in U.S. Appl. No. 12/863,510.
Nov. 7, 2013 Office Action issued in U.S. Appl. No. 12/993,098.
Ma et al., "Experimental Demonstration of an Active Quantum Key Distribution Network with Over Gbps Clock Synchronization", IEEE Communications Letters, vol. 11, No. 12, Dec. 2007.

(56) References Cited

OTHER PUBLICATIONS

Feb. 19, 2014 Notice of Allowance issued in U.S. Appl. No. 12/992,695.
Fung, Chi-hang Fred et al. "Security proof of quantum key distribution with detection efficiency mismatch," Jan. 2009, pp. 131-165, vol. 9, No. 1&2, Rinton Press.
Jan. 17, 2014 Notice of Allowance issued in U.S. Appl. No. 13/130,944.
Office Action dated Apr. 7, 2014 issued in U.S. Appl. No. 12/812,849.
John P. Barber; Integrated hollow and solid-core waveguides for sensor platforms; Year: 2005; OSA/IPRA; p. 1-3.
Office Action dated Mar. 25, 2014 issued in U.S. Appl. No. 12/863,509.

* cited by examiner

METHOD OF PERFORMING AUTHENTICATION BETWEEN NETWORK NODES The invention relates to the field of quantum cryptography generally, and more particularly to performing quantum cryptography over a distributed network.

In an example of quantum cryptography two end-points, or end-nodes, wish to communicate securely by establishing a quantum key with which to encrypt communications passing between them. To establish the quantum key, one end-node passes a quantum signal to the other end-node over a quantum channel, and following an exchange of messages over a classical channel a quantum key is agreed. Quantum communications exchanged between the nodes may be based on any one of a variety of known protocols, for example the so-called BB84 or B92 protocols, or the so-called six-state protocol or any of its variants. An important advantage of using a quantum cryptographic scheme for encrypting communications passing between the end-nodes is that an eavesdropper may be detected as a result of the quantum-mechanical principle that making an observation of a system in a superposition of states inevitably affects the state of the system.

In order to prevent a so-called 'man-in the-middle attack', in which an intercepting node arranges a quantum key with each end-node separately and without the knowledge of either end-node, the process of agreeing a quantum key may be followed by an authentication step in which each end-node is required to prove its identity to the other end-node. If the end-nodes share an authentication key, then the authentication step may be performed by each end-node encrypting a message using the authentication key and passing the resultant encrypted message to the other end-node. For example, the messages exchanged on the classical channel may be encrypted using the shared authentication key.

Practical considerations involved in quantum cryptography place an upper limit on the length of any given quantum channel. A practical arrangement for sending messages encrypted using a quantum cryptographic scheme may therefore take the form of a network of nodes in which adjacent nodes are separated by a distance appropriate to the sending of quantum signals between the these adjacent nodes. Certain schemes for providing end-to-end quantum encryption of messages from a starting-node to an end-point node require respective quantum keys to be established between the starting node and every intermediate node between the starting-node and the end-node. For example, in one scheme, a quantum key is established between a starting node and a given node by passage of a quantum signal from the given node to the previous node. The contents of the quantum signal are passed from the previous node to the starting-node using a quantum key established between the starting node and the previous node. A key agreement step is carried out directly between the starting-node and the given node. Following establishment of a quantum key between the starting node and the end-node, a traffic key for end-to-end encryption of data to be passed between end-nodes is passed from the starting node to the end-point node, the traffic key being encrypted using the quantum key.

The establishment of a quantum key between a starting node and any other node involves an authentication step using an authentication key shared between the two nodes. The number of authentication keys that must be stored by a general node in the network may be limited by only allowing certain nodes—Key Management Centres (KMCs)—to act as starting nodes, i.e. nodes from which encrypted messages may be sent to end-nodes. Each KMC stores a set of authentication keys, each authentication key being shared between the KMC and a respective network node. However, if a KMC needs to be replaced (e.g. for reasons of physical maintenance), in general every other node in the network must be provided with a respective new authentication key shared with that KMC. Also, if a particular node in the network (other than a KMC) is replaced, then in general respective new authentication keys must be established between that node and each KMC. Replacement of a KMC or of an intermediate or end-node is therefore likely to be a slow and expensive operation. A critical part of establishing an authentication key to be shared between two nodes is authentication of the nodes, i.e. each node proving its identity to the other. In establishing a quantum key between two nodes, once authentication has taken place, part of the agreed quantum key may be used to generate or update the shared authentication key.

A first aspect of the present invention provides a method of performing authentication between a first network node and a second network node, the first and second network nodes each sharing a respective authentication key with a third network node, and wherein (i) each of the first and second network nodes generates a respective message and encrypts the message using the authentication key shared with the third network node;

(ii) at the third network node, the message generated and encrypted at the first network node is de-crypted, re-encrypted using the authentication key shared by the second and third network nodes, and passed to the second network node for de-cryption; and (iii) at the third network node, the message generated and encrypted at the second network node is de-crypted, re-encrypted using the authentication key shared by the first and third network nodes, and passed to the first network node for de-cryption.

Thus, according to the present invention, authentication between the first and second nodes occurs via the third node which shares respective authentication keys with the first and second nodes. Once authentication has taken place, the first and second nodes may establish a shared authentication key. For example, if a quantum key is agreed between the first and second nodes, the whole or part of the quantum key may be used as the shared authentication key.

The first and second network nodes may directly exchange the encrypted messages generated in (i), and subsequently pass the encrypted messages to the third network node. Alternatively, the first and second network nodes may pass a respective encrypted message generated in (i) to the third network node prior to execution of (ii) and (iii). The latter alternative involves fewer exchanges between the first, second and third network nodes.

The method of performing authentication between the first and second network nodes may be used in establishing an authentication key to be shared between the first and second network nodes.

A second aspect of the invention provides a method of establishing a plurality of authentication keys within a network comprising first and second key management centres (KMCs), each of which authentication keys is to be shared by the first KMC and a respective network node, the method comprising the steps of:

(i) supplying the first and second KMCs with a shared authentication key;

(ii) establishing a shared authentication key for the first KMC and another node of the network, not being the second KMC, by the method of the first aspect of the invention in which the third network node is the second KMC; and (iii) repeating step (ii) for all other network nodes.

Where the first KMC needs to replaced (e.g. in the event of physical failure), the invention thus provides the advantage that only the first and second KMCs have to be provided with a shared authentication key; another network node may be authenticated with the first KMC by authentication between that network node and the second KMC, and between the first and second KMCs. The invention therefore speeds up the process of re-keying after failure or maintenance of a KMC. The second KMC retains shared authentication keys with network nodes other than the first KMC after such failure or maintenance.

Similarly, a third aspect of the invention provides a method of establishing a shared authentication key which is to be shared by a network node not being a KMC and a first KMC, within a network having first and second KMCs having a shared authentication key, the method comprising the steps of:
  (i) providing the network node and a second KMC with a shared authentication key; and
  (ii) establishing a shared authentication key between said network node and the first KMC by a method according to the first aspect of the invention, in which the third network node is the second KMC.

The invention therefore allows a node (not being a KMC) to be re-keyed with respective authentication keys shared between that node and each KMC by a process in which only one authentication key has to be supplied rather than established, this being an authentication key to be shared between the network node in question and one KMC. Authentication between the network node in question and another KMC may then be carried out by authentication between the network node and the KMC so supplied, and by authentication between the KMC so supplied and the other KMC. In other words, the KMC which is provided with an authentication key is used as the third network node in the first aspect of the invention. The method can be applied to provide re-keying of a node with many other KMCs, once an authentication key has been provided to the network node and a single KMC.

If memory available for storing authentication keys within individual nodes of a network is limited, the size of the network is also limited because each intermediate and end-point node must share an authentication key with every KMC. According to a fourth aspect of the invention, this problem is mitigated by a method of providing a first KMC and a network node not being a KMC with a shared authentication key, within a network having a second KMC sharing respective authentication keys with the first KMC and said network node, the method comprising the steps of:
  (i) establishing said shared authentication key by a method according to claim 4, said third network node being the second KMC; and
  (ii) in a memory of said network node, replacing the shared authentication key shared between the second KMC and said network node with the key established in step (i).

Thus, where a particular KMC needs to carry out authentication with an intermediate or end-node with which it does not share an authentication key (e.g. as part of an authentication step in establishing a quantum key), such a key may be established using the method of the first aspect of the invention and an existing authentication key stored in the intermediate or end-node's memory over-written with this key to allow authentication between the intermediate or end-node and the KMC. In general, a set of authentication keys stored in the memory of an intermediate or end-node may be dynamically updated to include an authentication key shared between that node and a KMC with which it is required to communicate if the node and that KMC do not already share an authentication key.

The invention also provides a method of a method of establishing a quantum key between first and second network nodes, the first and second network nodes sharing respective authentication keys with a third network node and the method comprising a key agreement step and an authentication step, and wherein, in the authentication step:
  (i) each of the first and second network nodes generates a respective cryptographic hash of a message it generates in the key agreement step using the authentication key shared with the third network node;
  (ii) at the third network node, the cryptographic hash generated by the first network node is de-crypted, re-encrypted using the authentication key shared by the second and third network nodes and passed to the second network node; and
  (iii) at the third network node, the cryptographic hash generated by the second network node is de-crypted, re-encrypted using the authentication key shared by the first and third network nodes and passed to the first network node.

The cryptographic hashes may be directly exchanged between the first and second network nodes prior to their being passed to the third network node for execution of (ii) and (iii). Alternatively, the first and second network nodes may each pass a respective cryptographic hash to the third network node prior to execution of (ii) and (iii).

The whole or part of the quantum key so established may be used to generate or update an authentication key to be shared by the first and second network nodes.

Embodiments of the invention are described below with reference to the accompanying drawings in which:

FIG. 9 shows how transmitters and receivers of the type shown in

Figure 8:
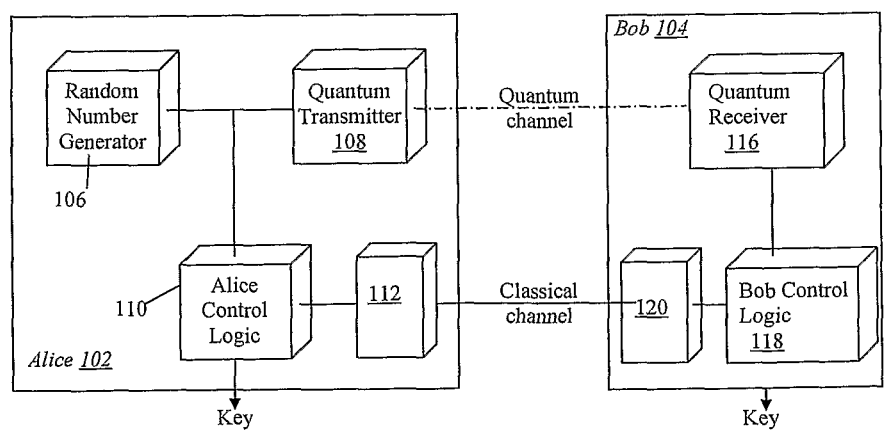
FIG. 8 shows a standard quantum-cryptographic transmitter (Alice) and receiver (Bob) arranged over a single optical link.

FIG. 8 may be used to form a network; and

Figure 10:
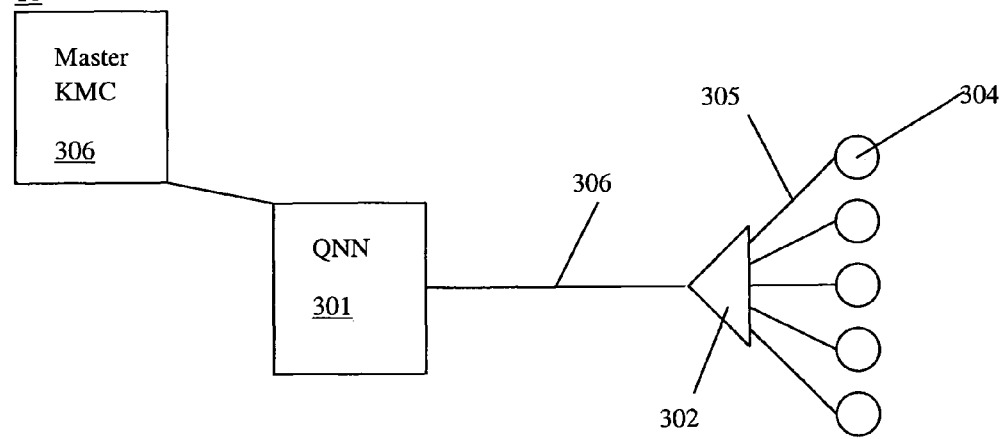

FIG. 10 shows a portion of a passive optical network (PON).

Figure 1:
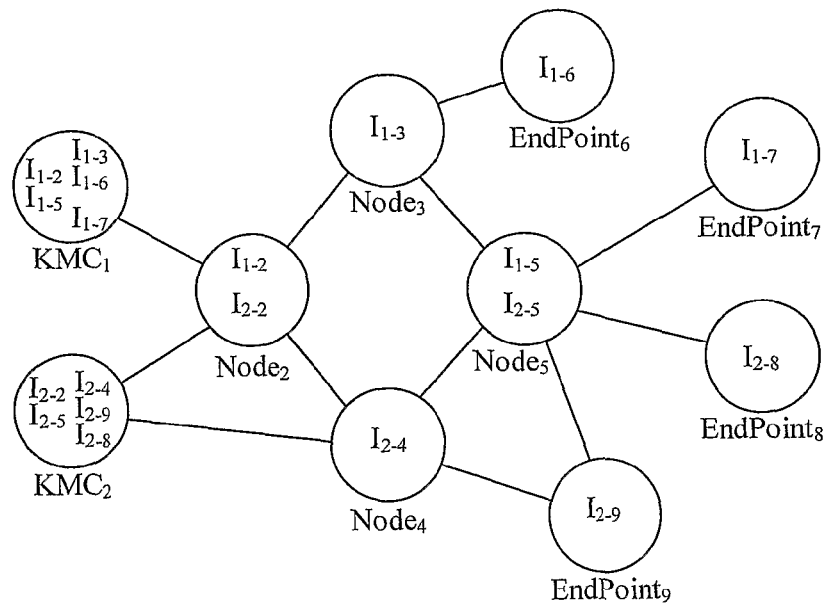
FIG. 1 shows an example network suitable for secure communication by use of quantum keys.

FIG. 1 shows a network for performing quantum cryptography, in this particular case for passing encrypted messages from either of two starting nodes (Key Management Centres, KMCs) KMC1, KMC2 to any of four end-point nodes EndPoint6, EndPoint7, EndPoint8, EndPoint9 via intermediate nodes Node2-5. A traffic key is used for encryption of data exchanged by end-point nodes; this key is supplied from the KMC to the end-point node in a form encrypted using a quantum key agreed between the KMC and the end-point node. This quantum key is established by process in which respective quantum keys are agreed between the KMC and every other node in a path between the KMC and the end-point node. For example, in order to establish a quantum key between KMC1 and EndPoint6 so that a traffic key, encrypted using the quantum key, may be sent from one to the other, quantum keys are established between KMC1 and Node2, between KMC1 and Node3 and finally between KMC1 and EndPoint6. In order to establish a quantum key between a KMC and a given node in a path between that KMC and an end-point node, a quantum signal is passed from the given node to the previous node in the path, and the information in that quantum signal is passed from the previous node to the KMC using a quantum key established between the previous node and the KMC. A key agreement step then takes place between the given node and KMC to establish a quantum key between these two nodes. This piecemeal approach to establishing a quantum key between a KMC and an end-point node deals with the issue that the distance between adjacent nodes in the network is limited by practical considerations relating to the maximum distance over which a quantum signal may be sent.

Figure 2:
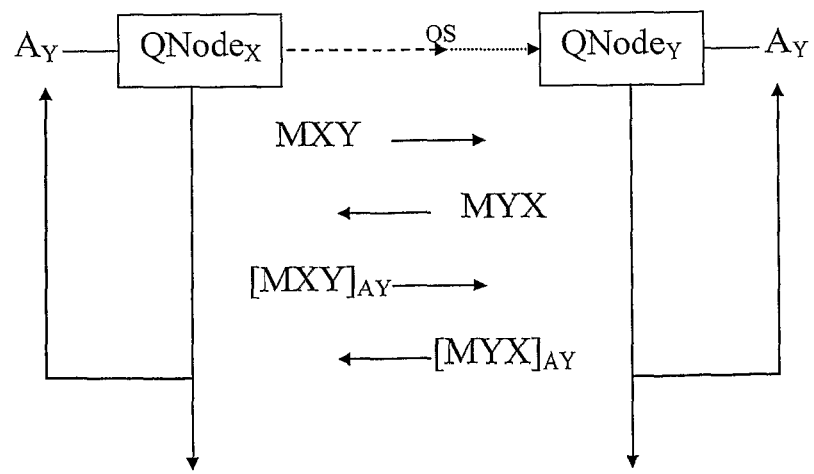
FIG. 2 shows steps in a method by which two network nodes may establish a quantum key.

FIG. 2 illustrates steps in the establishment of a quantum key between two network nodes, for example between KMC1 and Node 3 in the network of FIG. 1. In FIG. 2, the two nodes are labelled QNodeX and QNodeY. A quantum signal QS is sent from QNodeX to QNodeY (or vice-versa). QNodeX and QNodeY then exchange messages over a classical channel in a key agreement step, i.e. a step in which the quantum key is agreed. Finally, before that quantum key can be used, QNodeX and QNodeY must each prove its identity to the other in an authentication step. In the authentication step, each of the nodes QNodeX, QNodeY passes to the other a cryptographic hash of a message it passed to the other node in the key agreement step, the cryptographic hash being generated by mean of an authentication key AY which is shared by the two nodes QNodeX, QNodeY. In FIG. 2 the cryptographic hashes are denoted [MXY]AY and [MYX]AY. Each node decrypts the hash it receives from the other node using the authentication key to reproduce the messages MXY, MYX of the key agreement step, thus confirming the identity of the other node and hence protecting against a so-called 'man-in-the-middle attack'. The whole or part of the quantum key established between the nodes QNodeX, QNodeY may be used to generate or update the authentication key AY shared by the two nodes.

Referring again to FIG. 1, KMC1 shares authentication keys I1-2, I1-3, I1-5, I1-6, I1-7 with Node2, Node3, Node5, EndPoint6 and EndPoint 7 respectively. A quantum key may therefore be agreed between KMC1 and any one of these intermediate nodes and end-nodes. The quantum key may be changed to improve security. A new quantum key may be used to update a shared authentication key. Similarly, KMC2 shares authentication keys I2-2, I2-4, I2-5, I2-8 and I2-9 with Node2, Node4, Node5, EndPoint6 and EndPoint8 and EndPoint9 respectively. By arranging the network so that messages are only initiated from starting-nodes (KMCs) for transmission to and reading by end-nodes, the number of authentication keys that need to be stored by a typical node in the network is reduced compared to a network in which any node may generate and send a message to any other node.

Figure 3:
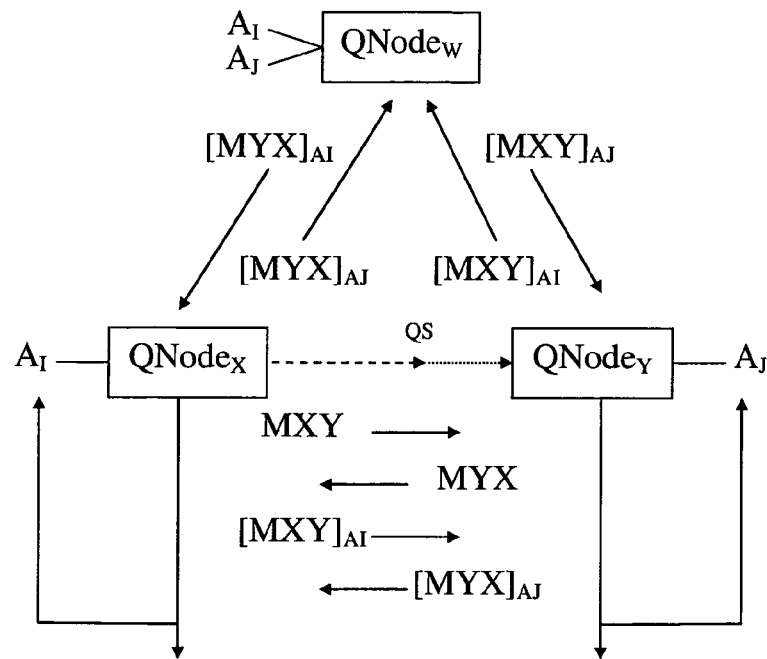
FIG. 3 shows steps in a method by which two network nodes establish a quantum key by authentication using a third network node.

FIG. 3 illustrates how a quantum key may be agreed between two nodes QNodeX, QNode Y where those two nodes do not share an authentication key but each shares a respective authentication key with a third node QNodeW. A quantum signal QS is passed from QNodeX to QNodeY. In a key agreement step, QNodeX and QNodeY exchange messages MXY, MYX over a classical channel to agree the quantum key. Since QNodeX and QNodeY do not share an authentication key each cannot each directly prove its identity to the other. Authentication is achieved via a third network node QNodeW, i.e. by a process of cross-authentication with the third network node QNodeW. QNodeX encrypts message MXY with the authentication key AI it shares with QNodeW to produce an encrypted message [MXY]AI, and QNodeY encrypts message MYX with the authentication key AJ that it shares with QNodeW to produce an encrypted message [MYX]AJ. The nodes QNodeX, QNodeY then exchange encrypted messages [MXY]AI, [MYX]AJ. QNodeX passes encrypted message [MYX]AJ to QNodeW at which it is de-crypted and re-encrypted using the authentication key AI shared by QNodeX and QNodeW to produce an encrypted message [MYX]AI which is passed to QNodeX where it is de-crypted to recover the message MYX. Similarly, QNodeY passes the encrypted message [MXY]AI to QNodeW where it is de-crypted and re-encrypted using the authentication key AJ shared by QNodeY and QNodeW to generate an encrypted message [MXY]AJ; this encrypted message is then passed to QNodeY where it is de-crypted to recover the message MXY. Following this cross-authentication via QNodeW, the quantum key may be used. The quantum key may be used to generate an authentication key to be shared between network nodes QNodeX and QNodeY.

The network nodes QNodeX, QNodeY will in general not be adjacent nodes. The quantum signal QS may be transmitted from QNodeX to another node from which the information in the quantum signal may be passed to QNodeY using a quantum key established between that node and QNodeX.

Figure 4:
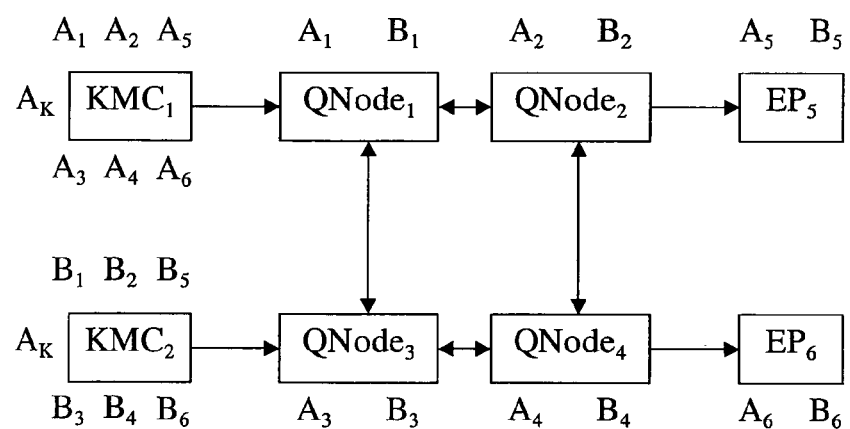
FIG. 4 illustrates storage of authentication keys in another example network.

FIG. 4 shows a simple network comprising two KMCs KMC1, KMC2, four intermediate nodes QNode1-4 and two end- or end point nodes EP5, EP6. The KMCs KMC1, KMC2 may generate messages, encrypt them with a traffic key, and pass them via the intermediate nodes for reception at the end-point nodes EP5, EP6. KMC1 shares authentication keys A1-A6 with respective intermediate nodes QNode1-6 and end-nodes EP5, EP6 as shown. Similarly, KMC2 shares authentication keys B1-B6 with respective intermediate nodes QNode1-6 and end-nodes EP5, EP6. Since only a KMC can act as a starting node, a given intermediate or end-point node only stores two authentication keys; one shared with KMC1 and the other shared with KMC2. KMC1 and KMC2 also share an authentication key AK.

Figure 5:
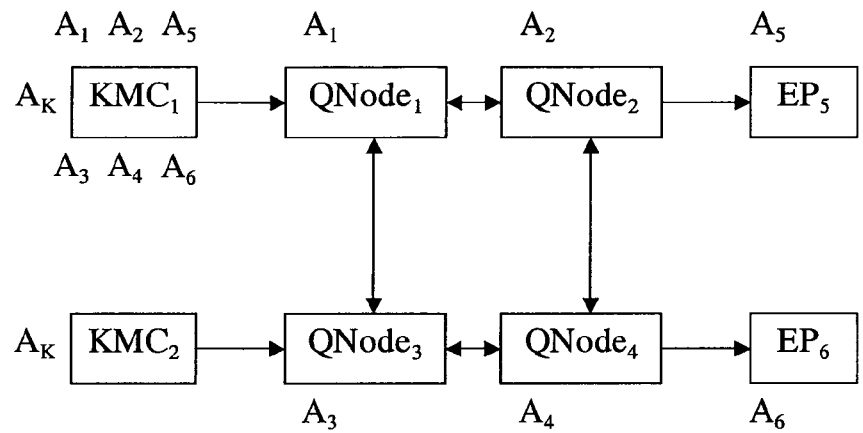
FIGS. 5 & 6 illustrate steps in a process of re-keying the network of FIG. 4.
Figure 6:
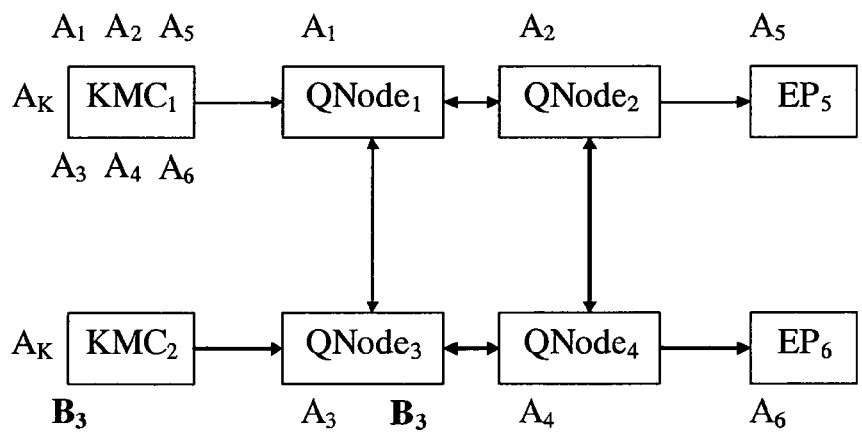

If KMC2 needs to be physically replaced or repaired for some reason, then the authentication keys shared with other nodes in the network must also be replaced. However, it is only necessary to physically supply KMC1 and KMC2 with a new authentication key AK; authentication keys shared between KMC2 and each other node in the network may be established using a method of the invention. Referring to FIG. 5, a new authentication key AK shared by KMC1 and KMC2 is physically supplied to both these nodes. In FIG. 6, an authentication key B3 shared by KMC2 and QNode3 may then be established by cross-authentication with KMC1 since QNode3 and KMC1 share an authentication key A3. A quantum key may be established between KMC2 and QNode3 and that quantum key may be used to generate the authentication key B3. Authentication keys B1, B2, B4, B5, B6 each of which is shared by KMC2 and one of the network nodes QNode1, QNode2, QNode4, EP5, EP6 may also be established by cross-authentication with KMC1. Following establishment of these authentication keys, the network is effectively re-keyed and hence restored to the state shown in FIG. 4. The process of re-keying may be applied to other networks having many more KMCs, intermediate nodes and end-point nodes than the numbers of these nodes in the network of FIG. 4.

A similar process may be applied if an intermediate or end-point node has to be replaced or repaired. For example if intermediate node QNode2 is replaced, then authentication keys A2, B2 must also be replaced. If a new authentication key A2 is supplied to KMC1 and to QNode2, then a new key authentication key B2 to be shared by KMC2 and QNode2 may be established by setting up a quantum key between KMC2 and QNode2, the authentication step being carried out between these two nodes by cross-authentication with KMC1, since QNode2 and KMC1 share an authentication key A2, and KMC1 and KMC2 share an authentication key AK. The process of re-keying an intermediate node or an end-point node may also be applied to a network having more than two KMCs. Once an authentication key is provided to the replaced node and a first KMC, authentication keys shared with the remaining KMCs and the replaced node may be established by cross-authentication using the authentication key shared between the replaced node and the first KMC and the authentication keys shared between the first KMC and the other KMCs.

Figure 7:
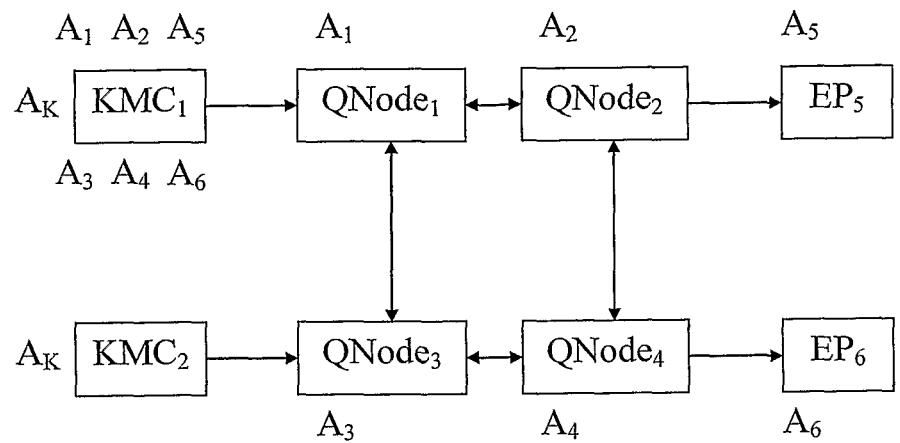
FIG. 7 shows another example network in which intermediate and end-nodes only store a single authentication key.

FIG. 7 shows network of KMCs, intermediate nodes and end-nodes similar to that shown in FIG. 4 except that each intermediate node and each end node only has sufficient memory to store a single authentication key. In FIG. 7 each intermediate and end node shares a respective authentication key with KMC1. KMC1 and KMC2 share an authentication key AK. IF KMC2 is required to establish a quantum key with QNode2 for example, authentication may be carried out between QNode2 and KMC1 and between KMC1 and KMC2 (i.e. cross authentication using KMC1) in order to establish the quantum key and hence establish an authentication key B2 to be shared by Qnode2 and KMC2. The value A2 may then be overwritten in memory of the QNode2 with the value B2. Thus, an authentication key stored in the memory of a intermediate or end-node may be dynamically updated to allow communication with another KMC.

Referring to FIG. 8 the basic hardware structure of a standard QKD system is shown. Unit 102 comprises a quantum transmitter, typically referred to as Alice, and is optically linked to unit 104 comprising a quantum receiver, typically referred to a Bob. The optical link may be through free space or any suitable waveguide but for illustration will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. There are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared quantum key as is well known. Note as used herein the term logic means any suitable device arrangement for performing the key agreement protocols. The control logic may be a suitably designed ASIC or a suitably programmed FPGA. The control logic could also be a suitably programmed microprocessor.

In establishing a common shared quantum key, Alice control logic 110 and Bob control logic 118 mutually authenticate each other (in order to exclude the possibility of a man-in-the-middle attack) by means of a shared authentication key.

Having used QKD to establish a quantum key, and mutually authenticated each other, Alice control logic 110 and Bob control logic 118 use that value in part to update the shared authentication key and in whole or part as a quantum key for encrypting subsequent communication between them.

Figure 9:
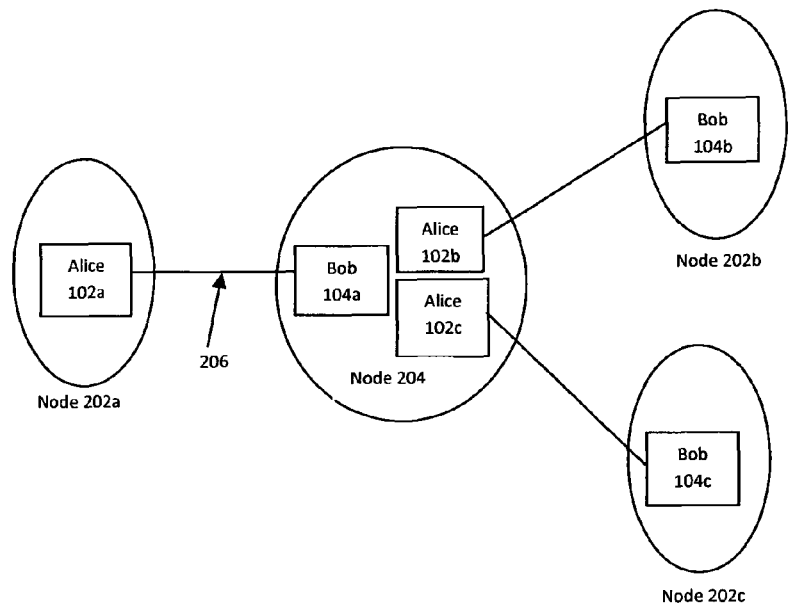

FIG. 9 illustrates how a simple network may be implemented in hardware. The network shown in FIG. 9 consists of three endpoint nodes 202a-c, each linked via a fibre optic link 206 with an intermediate (switching) node 204. The intermediate node 204 comprises an active switch (not shown) which can receive optical data on the link from any node and re-transmit that data out to any node.

Node 202a comprises an Alice unit 102a arranged in communication over the fibre link 206 with a Bob unit 104a within the intermediate node 204. The Alice and Bob units may be the same as described above with reference to FIG. 8. The intermediate node 204 also comprises Alice units 102b and 102c arranged in communication with Bob unit 104b in node 202b and Bob unit 104c in node 202c respectively.

In use suppose node 202a wishes to communicate with node 202b but wants to keep the communication secret from eavesdroppers and protect against it being delivered to node 202c by mistake. This may be achieved as follows. Node 202a may establish a first quantum key with switching node 204 by QKD and authenticate this quantum key with intermediate node 204 to ensure that it is indeed communicating with the intermediate node 204. This authentication is based on an authentication key shared by node 202a and intermediate node 204.

Node 202a may then instruct intermediate node 204 to transmit a series of single photons from Alice 102b to node 202b and, once the quantum transmission has occurred to tell node 202a what was sent. The communication between intermediate node 204 and node 202a is encrypted using the first quantum key to protect it from eavesdropping. Once it is aware of what quantum signal was transmitted node 202a undertakes an open classical communication with node 202b, via the intermediate node 204, to establish a quantum key as described above. Further, node 202a authenticates the key based on an authentication key known only to it a node 202b. In this way node 202a has confidence that it is talking to node 202b and does not need to trust intermediate node 204. Part of the agreed quantum key may be used as an authentication key shared between 202a and 202b and the rest can form a quantum key which can be used for end-to-end encryption between these two nodes.

Had the switching node mistakenly thought that node 202a wanted to talk to node 202c it might have instead transmitted a quantum signal from Alice unit 102c to node 202c and subsequently directed the classical communication of node 202a which is part of the key agreement step to node 202c. In such an event however the authentication step would fail because node 202c would not have the correct identity key.

If node 202b wanted to communicate with node 202a and they needed a new key it could simply ask node 202a to repeat the process. However it could establish the key itself by essentially performing the same process in reverse, i.e. it contacts intermediate node 204 to indicate it wishes to establish a quantum key with node 202. As a first stage Alice unit 102b of the intermediate node transmits a quantum signal to node 202b which they discuss to agree a quantum key, authenticating as usual. This time it is node 202b authenticating and hence the relevant authentication key used by intermediate node 204 is different. Having established this quantum key, Alice 102a is instructed to transmit a quantum signal to Bob 104a in the intermediate node. The intermediate node then sends details of each photon received to node 202b which then performs a key agreement step with 202a. Assuming everything is in order nodes 202b and 202a authenticate and agree the new quantum key for subsequent communications.

It is also possible for node 202b to agree a key with node 202c if desired. A first quantum key is established with intermediate node 204 as described above. Then Alice unit 102c sends a quantum signal to Bob unit 104c in node 202c, the details of which are sent by the intermediate node to node 202b using the first quantum key. Node 202b then undergoes a key agreement step with node 202c to agree a second quantum key, once 202b and 202c have mutually authenticated.

Where a network has a single KMC for a group of end nodes, the KMC is responsible for generating traffic keys that it distributes to the end nodes over encrypted links that are keyed using quantum keys. Where multiple KMCs are deployed to provide resilience and parallelism, they must all deliver the same traffic key to each end node.

This can be achieved by one KMC acting as master, generating the traffic keys and passing them to the other, slave, KMCs for onward distribution. Each KMC is then responsible for delivering traffic keys to some disjoint subset of the end nodes. To protect the traffic keys as they are passed between KMCs, each KMC treats the others as an end node and establishes a key with it using a distributed DQKD process, subsequently using that key to encrypt the traffic keys.

Should one KMC fail, then the other KMCs must take on its subset of the end nodes. Should the master KMC fail, one of the slave KMCs must take on the role of master. This is a well-known technique of master-slave fail-over.

Should the network fail in a way that leads to partitioning, it will go "split brain", which is where two KMCs in different partitions become the master. If this occurs, end points served by these KMCs will receive different traffic keys and so they can no longer communicate. In effect, a partitioning of the key distribution network will lead to a partitioning of the data network. Once the key distribution network heals, the two master KMCs will agree for one of them to become a slave and once the traffic key is updated, all end nodes will once again be able to communicate.

Although a master-slave arrangement is simplest, it can be generalised to form a hierarchical arrangement. This would be useful in very large scale or widely distributed networks.

FIG. 10 shows a portion of a passive optical network (PON) in which a quantum network node (QNN) 301 within a key distribution rack (KDR) is connected to a passive optical switch 302 by an optical fibre 306 and thence to a plurality of end-point nodes such as 304 via optical fibres such as 305. The QNN 301 communicates with a given end-point node using a key agreed with that end-point node, although the switch 302 distributes an encrypted message to each end-point nodes. Time-division multiplexing is used for communications sent from the end-point nodes to the QNN 301.

One way of eliminating the bottleneck presented by the QNN 301 is to make the QNN 301 a slave KMC (it may be constructed so it cannot act as a master), the QNN holding authentication keys for all the end point nodes connected to it, plus authentication keys for those KMCs that can act as master.

Should the PON's end points belong to different groups the KDR can be given multiple slave KMCs to maintain separation. It can also be given a standard quantum node. This means the master KMC can directly authenticate with an end point node, allowing cross authentication to be used to easily replace a slave KMC. In addition, should there be some group with fewer end point nodes than justifies deploying a slave KMC to serve them, the quantum node can be used by the master KMC to do this directly.

The multiple slave KMCs and quantum node will, in general, need to be able to communicate with every end point node and so must connect to every arm of the PON (such as 306). This requires a crossbar switching mechanism constructed in such a way as to preserve separation between KMCs. Such a switch can be constructed using MEMS arrays. Such an arrangement does not form a network, since each KMC has a direct connection to each end point in turn.

The invention claimed is:

1. A method of establishing a plurality of shared authentication keys within a network comprising first and second key management centres (KMCs) and a plurality of other network nodes, each of which shared authentication keys is to be shared by the first KMC and a respective network node, the method comprising the steps of:
   (i) supplying the first and second KMCs with a shared authentication key;
   (ii) establishing a shared authentication key between the first KMC and a network node by performing authentication between the first KMC and the network node, the network node not being the second KMC, the first KMC and the network node each sharing a respective authentication key with the second KMC, and wherein
      (a) each of the first KMC and the network node generates a respective message and encrypts the message using the authentication key shared with the second; KMC, wherein the first KMC and the network node directly exchange the encrypted messages and subsequently pass the exchanged encrypted messages to the second KMC;
      (b) at the second KMC, the message generated and encrypted at the first KMC is decrypted, re-encrypted using the authentication key shared by the network node and the second KMC, and passed to the network node for decryption; and
      (c) at the second KMC, the message generated and encrypted at the network node is decrypted, re-encrypted using the authentication key shared by the first and second KMCs, and passed to the first KMC for decryption; and
   (iii) repeating step (ii) for all other network nodes.

2. A method of establishing a quantum key between first and second network nodes, the first and second network nodes sharing respective authentication keys with a third network node, the method comprising a quantum exchange step, a key agreement step and an authentication step, wherein
   in the quantum exchange step, a quantum signal is exchanged between network nodes,
   in the key agreement step, the first and second network nodes generate messages, the first and second network nodes exchange the messages according to the authentication step, and the first and second nodes agree a quantum key using the exchanged messages, and
   in the authentication step:
      (i) each of the first and second network nodes generates a respective cryptographic hash of the message it generates in the key agreement step using the authentication key shared with the third network node;

(ii) at the third network node, the cryptographic hash generated by the first network node is decrypted, re-encrypted using the authentication key shared by the second and third network nodes and passed to the second network node; and (iii) at the third network node, the cryptographic hash generated by the second network node is decrypted, re-encrypted using the authentication key shared by the first and third network nodes and passed to the first network node, wherein the first and second network nodes directly exchange the respective cryptographic hashes before passing them to the third network node for execution of steps (ii) and (iii).

3. A method according to claim 2 wherein the first and second network nodes each pass a respective cryptographic hash to the third network node prior to execution of steps (ii) and (iii).

4. A method according to claim 2 further comprising the step of using at least part of the quantum key to generate or update an authentication key shared by the first and second network nodes.

5. A method according to claim 2 in which the quantum signal is exchanged between the first and second network nodes.

6. The method according to claim 1, wherein the first KMC and the network node directly exchange the respective messages before passing them to the second KMC for execution of steps (ii) and (iii).

7. The method according to claim 1, wherein the first KMC and the network node each pass a respective message to the second KMC prior to execution of steps (ii) and (iii).

8. The method according to claim 1, wherein the shared authentication key between the first KMC and the network node is different than the shared authentication key between the first KMC and the second KMC, and the shared authentication key between the first KMC and the network node is different than the shared authentication key between the network node and the second KMC.

* * * * *